Nov. 6, 1956     P. P. COPPOLA ET AL     2,769,708
THERMIONIC CATHODE AND METHOD OF MAKING THE SAME
Filed June 11, 1953
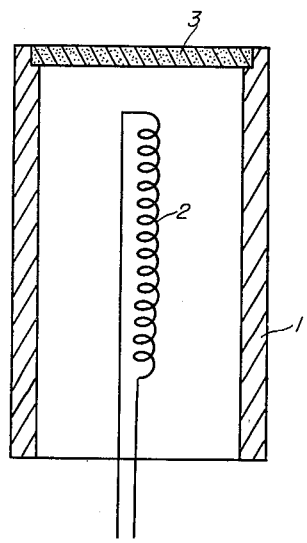
INVENTORS
Patrick P. Coppola
Ray C. Hughes
Otto G. Koppius
BY
AGENT

United States Patent Office 2,769,708
Patented Nov. 6, 1956

2,769,708

THERMIONIC CATHODE AND METHOD OF MAKING THE SAME

Patrick P. Coppola, Dobbs Ferry, Ray C. Hughes, Ardsley, and Otto G. Koppius, White Plains, N. Y., assignors, by mesne assignments, to North American Philips Company, Inc., New York, N. Y., a corporation of Delaware Application June 11, 1953, Serial No. 361,054

4 Claims. (Cl. 75—206)

Our invention relates to a thermionic cathode and method of making the same. More particularly, our invention relates to a cathode containing an internal supply of alkaline earth compounds capable of furnishing free alkaline earth metal to at least one electron emissive surface of the cathode.

In a co-pending application Serial No. 258,892 filed November 29, 1951, by R. C. Hughes et al., now Patent No. 2,700,118, a cathode is described which contains an internal supply of alkaline earth compounds capable of furnishing free alkaline earth metal to at least one electron emissive surface of the cathode. Such a cathode is made by mixing a powdered refractory metal such as tungsten with one or more alkaline earth compounds, such as a barium aluminate containing about 70% by weight of BaO in powder form, pressing the mixture to form a body, and firing the body at a relatively low temperature, e. g., 1370° C. to form a coherent body. During activation of the cathode, the alkaline earth compound reacts with the refractory metal to furnish to at least one surface of the body free alkaline earth metal substantially without deleterious reactions occurring with the refractory metal. However, such cathodes have been found to contain entrained or entrapped gas and are somewhat unstable toward atmospheric influences.

A principal object of this invention is to provide an improved cathode of the aforesaid type.

Another object of this invention is to provide a cathode which activates more quickly.

A further object of this invention is to provide a cathode of this type which is relatively unaffected by exposure to air.

A still further object of this invention is to provide a method of making such a cathode in which entrained gas is substantially eliminated.

Another object of this invention is to provide a method of making mechanically stronger cathodes.

All of the foregoing objects and others will be apparent from the description of the invention that follows.

Our invention, briefly stated, comprises a cathode which is made by pressing a mixture of a powdered refractory metal, such as tungsten, and an alkaline earth composition consisting of an alkaline earth oxide and one or more oxides of a metal other than an alkaline earth metal into a body and firing the body for a short time in vacuum or inert atmosphere at a temperature at which the alkaline earth composition melts to permit evolution of the gas.

The temperature and duration of time at which the pressed body is fired are extremely critical for the manufacture of a successful cathode. The temperature must be sufficiently high to melt the alkaline earth composition and the body must be held at that temperature for a sufficient time to permit evolution of the gas in the body; but, the temperature should not be too high or the firing time too long in order to prevent any extensive reaction between the refractory metal and the alkaline earth composition which results in the production of free alkaline earth metal.

At the temperatures at which the alkaline earth composition melts, some sintering of the particles of the refractory metal will also take place as a result of which a stronger, more coherent body will be produced which generally will resist shock caused by striking a hard surface. Furthermore, we have found that the pressed and fired bodies may be ground, machined or polished as desired.

The invention will be described in detail in connection with the accompanying drawing which is a cross-sectional view of a cathode according to our invention and in connection with the following illustrative example.

The cathode shown in the accompanying figure comprises a tube of molybdenum 1, enclosing a heating element 2 and a disc-shaped cathode element 3 of the type according to our invention closing one end of the molybdenum tube 1. The cathode element may be secured in place by pinching the tube, providing recesses to support the cathode or by welding.

The cathode was prepared by mixing about 10% by weight of powdered barium aluminate having the proportion of 5 moles of BaO to 2 moles of $Al_2O_3$ with 90% by weight of powdered tungsten. The resulting mixture was pressed in a die under a pressure of 70,000 to 140,000 pounds per square inch to form a body having a thickness of about 0.07 in. The pressed body was placed in a molybdenum firing chamber and fired in vacuum at a temperature of about 1650–1750° C. brightness as measured by an optical pyrometer sighted on the molybdenum firing chamber. This temperature was maintained for about 30 seconds and the body was then rapidly cooled. The resulting fired body was mounted in a molybdenum tube provided with a heater and activated. After activation the cathode had an emission density for about 2 amperes per square centimeter of emitting surface at a temperature of about 1000° C. and continued to emit at an undiminished level for 2,500 to 3,000 hours when held continuously at a temperature of 1130° C.

The following table indicates the emission density and life of several cathodes made and in accordance with the foregoing procedure.

| Tube No. | Emission, amps./cm.$^2$ at 1,000° C. | Life, hrs. at 1,130° C. |
|---|---|---|
| A-97 | 2.3 | Over 3,000. |
| A-99 | 2.3 | Over 2,700. |
| A-118 | 2.6 | Over 3,500. |
| A-121 | 2.5 | Over 2,700. |

While we have described a method of making a cathode employing as the refractory metal, according to our invention, tungsten, and as the alkaline earth composition a barium aluminate, any of the refractory metals and any of the alkaline earth compositions disclosed in co-pending application Serial No. 258,892 may be used and we wish it to be clearly understood that our invention constitutes an improvement in the cathodes disclosed therein and the disclosure of that application insofar as it pertains to this application is to be considered a part hereof.

The elements "silicon" and "boron" as they are referred to in said application are to be construed herein as "metals" and the term "metal oxide" as used herein and in the claims is to be construed to include the oxides of those elements.

What we claim is:

1. A method of making a thermionic dispenser cathode comprising the steps, mixing about 90% by weight of a powdered refractory metal and about 10% by weight of a powdered fused mixture of at least 60% by weight of an alkaline earth metal oxide and the remainder principally aluminum oxide, pressing said mixture into a body, and firing said body at a temperature of about 1650° to 1750° C. for about one-half minute to form a coherent composite mass of the refractory metal and said fused mixture free of entrained gas.

2. A method of making a thermionic dispenser cathode comprising mixing about 90% by weight of tungsten and about 10% by weight of a fused mixture of 5 moles of barium oxide and 2 moles of aluminum oxide, pressing said mixture into a body, and firing said body at a temperature of about 1650° to 1750° C. for about one-half minute to form a coherent composite mass of tungsten and said fused mixture free of entrained gas.

3. A thermionic dispenser cathode comprising a sintered porous body of refractory metal, and a supply within the pores of said body of a fused mixture of at least about 60% by weight of an alkaline earth oxide and the remainder principally aluminum oxide, said body being fired at a temperature of about 1650° to 1750° C. for about one-half minute to substantially free said body of entrained gas.

4. A thermionic dispenser cathode comprising a sintered porous body of tungsten, and a supply within the pores of said body of a fused mixture of 5 moles of barium oxide and 2 moles of aluminum oxide, said body being fired at a temperature of about 1650° to 1750° C. for about one-half minute to substantially free said body of entrained gas.

References Cited in the file of this patent

UNITED STATES PATENTS

| | | |
|---|---|---|
| 1,109,887 | Wolsbach | Sept. 8, 1914 |
| 1,363,162 | Myers | Dec. 21, 1920 |
| 1,922,244 | Hunter | Aug. 15, 1933 |
| 2,085,605 | Ramsay et al. | June 29, 1937 |
| 2,121,589 | Espe | June 21, 1938 |

FOREIGN PATENTS

| | | |
|---|---|---|
| 705,766 | Germany | May 6, 1941 |
| 953,158 | France | May 16, 1949 |